US008190199B2

(12) United States Patent
Shim

(10) Patent No.: US 8,190,199 B2

(45) Date of Patent: May 29, 2012

(54) MULTIBAND-MULTIMODE MOBILE COMMUNICATION TERMINAL AND ITS METHOD FOR CONTROLLING THE MODEM POWER

(75) Inventor: Jeong-Hun Shim, Seongnam-si (KR)

(73) Assignee: KT Tech, Inc., Gyeonggi-Do (KR)

( * ) Notice: Subject to any disclaimer, the term of this patent is extended or adjusted under 35 U.S.C. 154(b) by 932 days.

(21) Appl. No.: 12/087,120

(22) PCT Filed: Sep. 14, 2006

(86) PCT No.: PCT/KR2006/003664

§ 371 (c)(1), (2), (4) Date: Sep. 9, 2008

(87) PCT Pub. No.: WO2007/074963

PCT Pub. Date: Jul. 5, 2007

(65) Prior Publication Data

US 2009/0029729 A1 Jan. 29, 2009

(30) Foreign Application Priority Data

Dec. 26, 2005 (KR) ........................ 10-2005-0129817

(51) Int. Cl.
*H04M 1/00* (2006.01)

(52) U.S. Cl. ................ 455/553.1; 455/552.1; 455/127.4

(58) Field of Classification Search ............... 455/552.1, 455/435.2, 436, 553.1, 127.4, 550.1, 3.06, 455/42, 102
See application file for complete search history.

(56) References Cited

U.S. PATENT DOCUMENTS

2005/0128980 A1 6/2005 Han et al.
2005/0180454 A1 * 8/2005 Lee et al. ...................... 370/465

FOREIGN PATENT DOCUMENTS

KR 1020050045298 5/2005
WO WO 2005/048490 5/2005

* cited by examiner

*Primary Examiner* — Dominic E Rego

(74) *Attorney, Agent, or Firm* — Harness, Dickey & Pierce, P.L.C.

(57) ABSTRACT

The present invention is directed to an MB-MM mobile communication terminal. According to a preferred embodiment of the present invention, an MB-MM mobile communication terminal comprising a first modem and a second modem, further comprises an activation control unit determining whether the second modem is activated if the activation control unit receives an activation order from the first modem for activating the second modem. The activation control unit authorizes the power to the second modem only if the second modem is not activated. The present invention can provide an MB-MM mobile communication terminal that is able to prevent an equipped modem from being read as activated although the equipped modem is actually not activated and a method for controlling the modem power of the MB-MM mobile communication terminal.

8 Claims, 2 Drawing Sheets

CDMA mobile communication network
100
110-1
Overlay area
110-2
Overlay area
120-1
120-2
Overlay area
110-3

[Fig. 1]
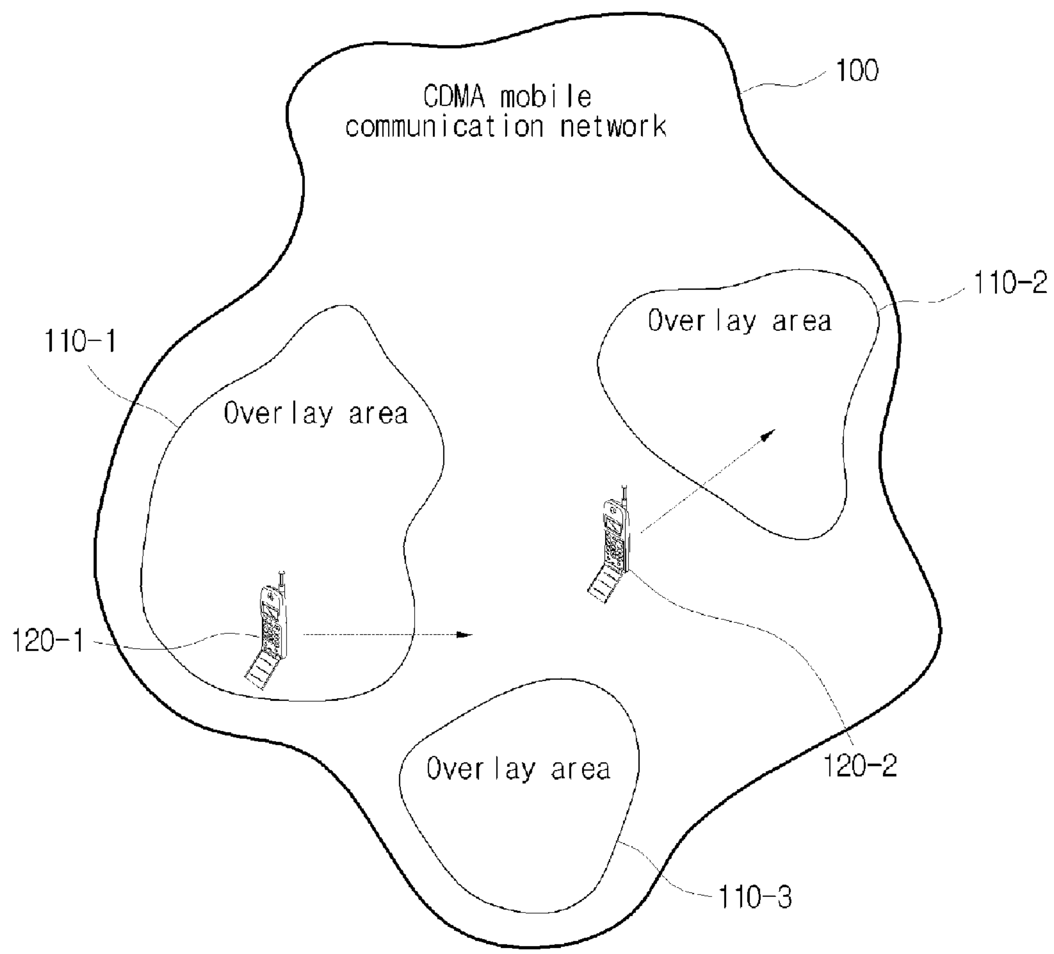
[Fig. 2]
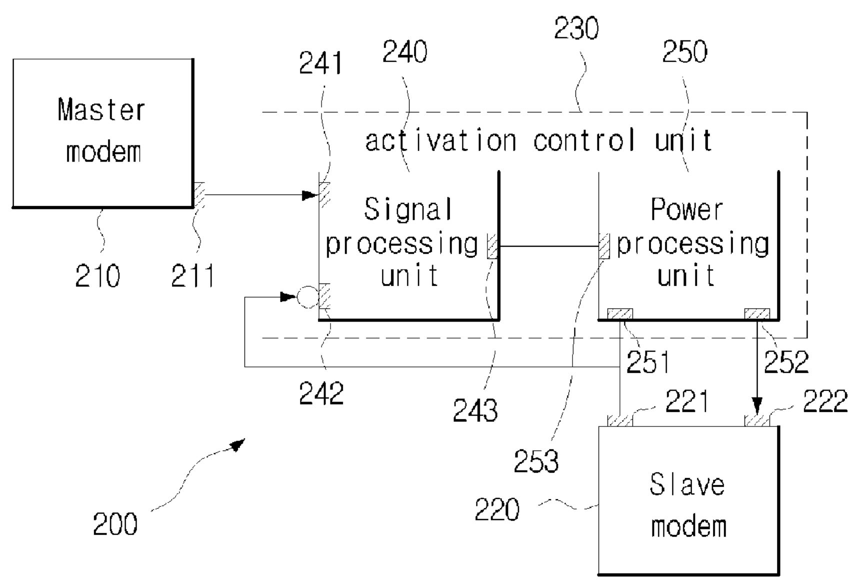

[Fig. 3]
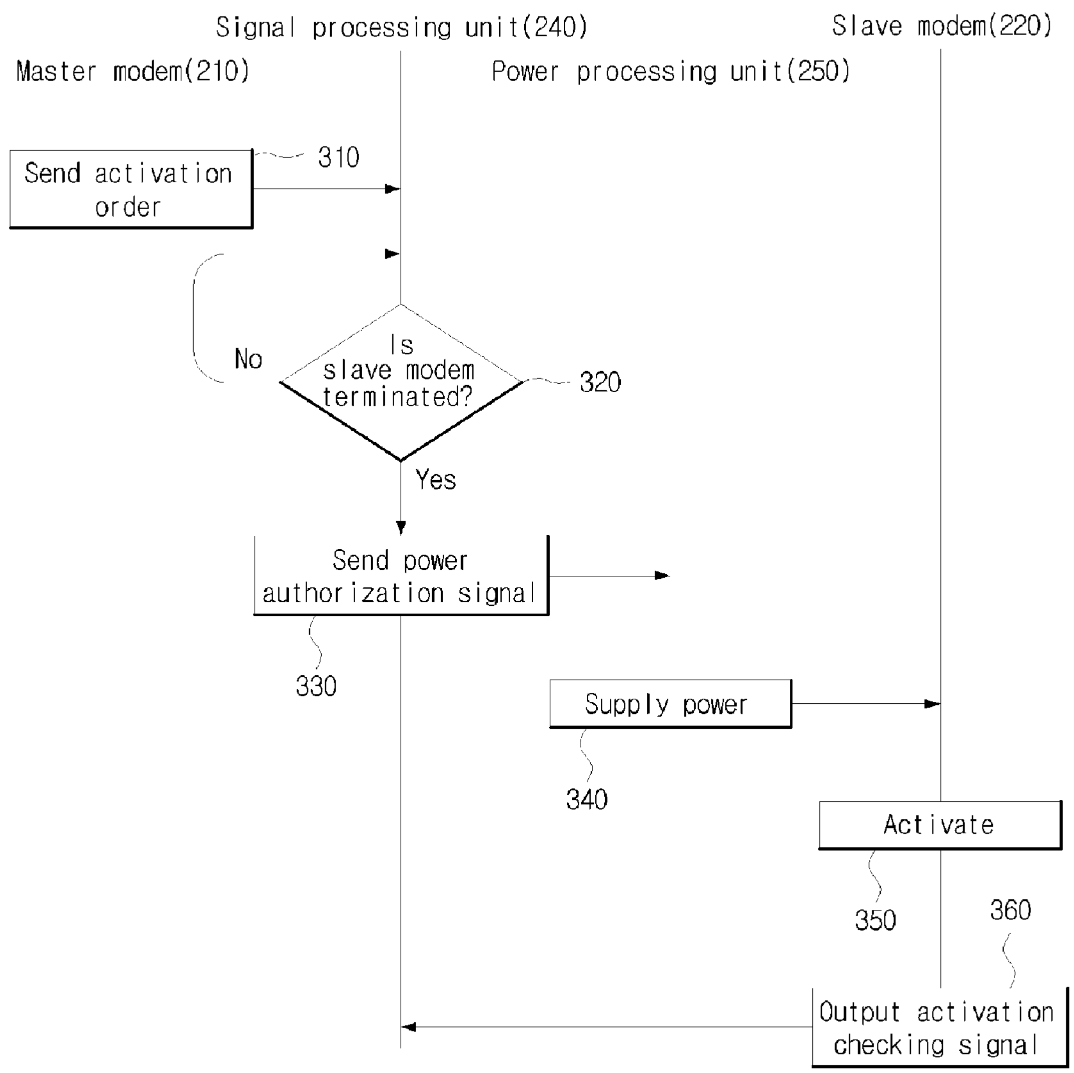

MULTIBAND-MULTIMODE MOBILE COMMUNICATION TERMINAL AND ITS METHOD FOR CONTROLLING THE MODEM POWER

TECHNICAL FIELD

The present invention is directed to a mobile communication terminal, more specifically to a multiband-multimode mobile communication terminal and its method for controlling the modem power.

BACKGROUND ART

Generally, a mobile communication terminal is a portable device that can provide a voice communication with a person at a distant place. At the beginning, a portable terminal could provide a voice communication only, but it is being developed to a data communication device using letters and symbols as well as video signals.

A code division multiple access (referred to as "CDMA" hereinafter) communication system has been suited for a voice and data communication method using letters and symbols because of relatively smaller data sizes. However, the recent multimedia communication system using video signals requires a communication system that has a faster data transmission speed because of larger data sizes. The system to suit this requirement is the third generation partnership project (3GPP), for example, the wideband code division multiple access (referred to as "WCDMA" hereinafter).

Moreover, the mobile communication terminal can be classified according to the method of accessing a mobile communication network. That is, there can be a portable terminal that provides a voice and data communication by accessing a CDMA mobile communication system, a portable terminal that provides a multimedia communication by accessing a WCDMA mobile communication system, and an MB-MM mobile communication terminal that communicates by selectively accessing a CDMA mobile communication system and a WCDMA mobile communication system.

FIG. 1 shows an illustration of a mobile communication network for providing a WCDMA service in a communication environment in which a CDMA mobile communication network is fundamentally established.

As shown in FIG. 1, the current CDMA mobile communication network 100 is provided in a vast coverage area. However, a WCDMA mobile communication network is provided in sections of the CDMA mobile communication network 100. Therefore, some areas of the CDMA mobile communication network can coincide with the WCDMA mobile communication network, and these areas can be referred to as overlay areas 110. Of course, the WCDMA mobile communication network can exist independently outside a CDMA mobile communication network 100.

Co-present in the overlay areas 110 are both a CDMA mobile communication network 100, which is the second generation mobile communication network, and a WCDMA mobile communication network, which is a third generation mobile communication network. However, a WCDMA mobile communication network is preferably applied in the overlay areas 110, in order to use a WCDMA mobile communication service having a multimedia communication capability. Therefore, a user has to have an MB-MM mobile communication terminal (120-1, 120-2, referred to as "120" hereinafter) that encompasses both a CDMA modem and a WCDMA modem, which are selectively driven, in order to selectively use a WCDMA-type service and a CDMA-type service inside and outside the overlay areas (hereinafter referred to as "WCDMA mobile communication network") 110. Therefore, intersystem handover between the modems equipped in an MB-MM mobile communication terminal 120 is needed in order to provide an uninterrupted service in case a user moves from a WCDMA mobile communication network 110 to a CDMA mobile communication network while using the MB-MM mobile communication terminal 120.

Generally, a WCDMA modem equipped in an MB-MM mobile communication terminal 120 is always operating while the MB-MM mobile communication terminal 120 is operating (even though the WCDMA modem is within a CDMA mobile communication network 100) and controls the activation and/or termination of a CDMA modem. For example, in case an MB-MM mobile communication terminal 120 moves from a WCDMA mobile communication network 100 to a CDMA mobile communication network 100, a WCDMA modem transmits an activation order (for activating a CDMA modem) to a CDMA modem in order to carry out the handover. On the other hand, a WCDMA modem transmits an termination order (for terminating a CDMA modem) to a CDMA modem in case a conventional MB-MM mobile communication terminal 120 moves from a CDMA mobile communication network 100 to a WCDMA mobile communication network 120. The CDMA modem that received an activation order transmits an activation confirmation signal (e.g., ACK signal) to a WCDMA modem if the modem is properly activated. Moreover, the CDMA modem that received a termination order transmits a termination confirmation signal (e.g., ACK signal) to a WCDMA modem if the modem is properly terminated.

The WCDMA modem can verify a normal activation of the CDMA modem through the activation confirmation signal. Moreover, the WCDMA modem can verify a normal termination of the CDMA modem through the termination confirmation signal. If no negative confirmation signal (e.g. NACK) corresponding to an activation order of the WCDMA modem is received for a predetermined duration, the WCDMA modem can regard that an activation confirmation signal is received from the CDMA modem. This mechanism is identical when the WCDMA modem outputs a termination order.

If a WCDMA modem controls the activation and/or termination of a CDMA modem by a method described above, it is possible that the CDMA modem is not activated and/or terminated normally because the activation order and/or termination order transmitted from the WCDMA modem is lost. Moreover, if a WCDMA modem does not receive an NACK signal corresponding to an activation termination order transmitted to a CDMA modem, and thereby regards that the CDMA modem is normally terminated (although the CDMA modem is not actually terminated), it is possible that the WCDMA modem erroneously retransmits an activation order to a CDMA modem that is already activated for reasons such as handover. Conversely, the same problem is possible for the case of a WCDMA modem transmitting a termination order to a CDMA modem. Moreover, if a CDMA modem is regarded as terminated although the CDMA modem is not terminated, it can activate both the CDMA modem and the WCDMA modem, causing serious drain of battery power in the terminal.

DISCLOSURE OF INVENTION

Technical Problem

In order to solve the aforementioned problem, the present invention aims to provide an MB-MM mobile communication terminal that is able to prevent an equipped modem from being read as activated although the equipped modem is actually not activated and a method for controlling the modem power of the MB-MM mobile communication terminal.

Another objective of this invention is to provide an MB-MM mobile communication terminal that is able to prevent an equipped modem from being read as terminated although the equipped modem is actually not terminated and a method for controlling the modem power of the MB-MM mobile communication terminal.

Another objective of this invention is to provide an MB-MM mobile communication terminal that is able to prevent serious drain of battery power caused by regarding an equipped modem as terminated although the equipped modem is actually not terminated and a method for controlling the modem power of the MB-MM mobile communication terminal.

Technical Solution

In order to achieve the aforementioned objects, an aspect of the present invention features a multiband-multimode (MB-MM) mobile communication terminal.

According to a preferred embodiment of the present invention, the MB-MM mobile communication terminal has a first modem and a second modem. The MB-MM mobile communication terminal also has an activation control unit. The activation control unit determines whether the second modem is activated if an activation starting order for activating the second modem is inputted from the first modem, and authorizes the power to the second modem only if the activation of the second modem is terminated.

The activation control unit can also have a signal processing unit. The signal processing unit receives the activation order from the first modem through a non-inversion input terminal, determines whether the second modem is activated, and outputs a power authorization order through an inversion input terminal if the activation of the second modem is terminated. A power processing unit authorizes the power to the second modem in accordance with the power authorization order.

The signal processing unit can be an AND gate.

Another aspect of the present invention features an MB-MM mobile communication terminal.

According to a preferred embodiment of the present invention, the MB-MM mobile communication terminal has a first modem and a second modem. The MB-MM mobile communication terminal also has an activation control unit. The activation control unit determines whether the activation of the second modem is terminated if an activation starting order for starting the activation of the second modem is inputted from the first modem, and authorizes the power to the second modem only if the activation of the second modem is terminated.

The activation control unit can also have a signal processing unit. The signal processing unit receives the activation order from the first modem through a non-inversion input terminal, determines whether the second modem is activated, and outputs a power cutoff order through an inversion input terminal if the second modem is determined to be activated. A power processing unit cuts off the power applied to the second modem in accordance with the power cutoff order.

The signal processing unit can be an AND gate.

Another aspect of the present invention features a method for controlling the modem power of an MB-MM mobile communication terminal comprising a first modem, a second modem and an activation control unit. The method is performed by the activation control unit. In the method, an activation order for activating the second modem is received from the first modem. The method determines whether the activation of the second modem is terminated. And the power is authorized to the second modem only if the activation of the second modem is terminated.

The activation control unit can have a signal processing unit receiving the activation starting order from the first modem through a non-inversion input terminal, determining whether the second modem is activated and outputting a power authorization order through an inversion input terminal if the activation of the second modem is determined to be terminated. The activation control unit can also have a power processing unit authorizing the power to the second modem in accordance with the power authorization order.

The signal processing unit can be an AND gate.

To achieve the aforementioned objects, another aspect of the present invention features a method for controlling the modem power of an MB-MM mobile communication terminal.

According to a preferred embodiment of the present invention, the MB-MM mobile communication terminal has a first modem, a second modem and an activation control unit. The method for controlling the modem power is performed by the activation control unit. In the method, a termination order for terminating the activation of the second modem is received from the first modem. The method determines whether the second modem is activated. The power applied to the second modem is cut off only if the second modem is activated.

The activation control unit can have a signal processing unit, which receives the termination order from the first modem through a non-inversion input terminal, determines whether the second modem is activated and outputs a power cutoff order through an inversion input terminal if the second modem is determined to be activated. The activation control unit can also have a power processing unit, which cuts off the power applied to the second modem in accordance with the power cutoff order.

The signal processing unit can be an AND gate.

BRIEF DESCRIPTION OF THE DRAWINGS

These and other features, aspects, and advantages of the present invention will become better understood with regard to the following description, appended claims, and accompanying drawings where:

FIG. 1 shows an illustration of a mobile communication network for providing a WCDMA-type service in a communication environment in which a CDMA mobile communication network is fundamentally established;

FIG. 2 shows a block diagram of an MB-MM mobile communication terminal based on a preferred embodiment of the present invention; and FIG. 3 shows a flowchart of a method for controlling the modem power of an MB-MM mobile communication terminal based on a preferred embodiment of the present invention.

MODE FOR THE INVENTION

The present invention, operative advantages of the present invention, and objectives achieved by embodying the present invention shall be evident with reference to the accompanying drawings and the description therein.

Hereinafter, preferred embodiments of the present invention shall be described in detail with reference to the accompanying drawings. To aid overall understanding of the present invention, the same reference numeral shall be assigned to the same means, regardless of the figure number. Ordinal numbers (e.g. first, second, etc.) are used for description only, assigned to the elements in no particular order, and shall by no means specify the name of the pertinent element or restrict the claims.

The following description only illustrates the principle of the present invention. Therefore anyone of ordinary skill in the art shall be able to easily embody various apparatuses and/or methods, although not described or depicted, within the scope of the present invention. Moreover, it shall be understood that the principles, points of view, and preferred embodiments of the present invention comprise functional and structural permutations.

Moreover, although the embodiments describe an MB-MM mobile communication terminal with a master modem and a slave modem each, it shall be evident that 2 or more slave modems can be provided in the MB-MM mobile communication terminal.

Moreover, to aid overall understanding of the present invention, a first modem is defined as a master modem, and a second modem as a slave modem, but the present invention shall not be restricted by these terms (i.e. first, second, master, and slave).

FIG. 2 shows a block diagram of an MB-MM mobile communication terminal based on a preferred embodiment of the present invention.

Referring to FIG. 2, an MB-MM mobile communication terminal 200 based on a preferred embodiment of the present invention comprises a master modem 210, a slave modem 220 and an activation control unit 230. The activation control unit 230 can comprise a signal processing unit 240 and a power processing unit 250. Although not illustrated, it is evident that the MB-MM mobile communication terminal 200 can, of course, further comprises, for example, an input unit, a display unit and an RF processing unit.

The master modem 210 processes and controls various kinds of signals in base band when the MB-MM mobile communication terminal 200 functions in a master mode (that is, a communication mode using a communication system corresponding to the master modem 210). Particularly, the master modem 210 transmits an activation order to a non-inversion input terminal 241 in the signal processing unit 240 through a power control terminal 211 in order to activate the slave modem 220 that is terminated because of handover from the master modem 210 to the slave modem 220. Moreover, the master modem 210 transmits a termination order to a non-inversion terminal 241 in the signal processing unit 240 in case the slave modem 220 has to be terminated because of handover from the slave modem 220 to the master modem 210.

The slave modem 220 processes and controls various kinds of signals in base band when the MB-MM mobile communication terminal 200 functions in a slave mode (that is, a communication mode using a communication system corresponding to the slave modem 220). Particularly, the slave modem 220 is activated and/or terminated by the control of the master modem 210. In other words, the power is supplied to the slave modem 220 from a power processing unit 250 if an activation order is outputted from the master modem 210 while the slave modem 220 is terminated. At this point, the slave modem 220 can be supplied with the power through a power output terminal 252 of a power processing unit 250 that is connected to a power input terminal 222. Moreover, the power that has been supplied from the power processing unit 250 is dis connected if a termination order is outputted from the master modem 210 while the slave modem 220 is activating.

A power hold terminal 221 of the slave modem 220 (referred to as "slave power hold terminal" hereinafter) can be connected to a power switch hold terminal 251 in the power processing unit 250 and to an inversion input terminal 242 of the signal processing unit 240 each, and the slave power hold terminal 221 can output an activation checking signal if the slave modem 220 is activating and output no signal while the slave modem 220 is terminated. In other words, the slave power hold terminal 221 can be used to indicate a regular activation and/or termination of the slave modem 220 to the signal processing unit 240 and/or the power processing unit 250.

If the activation control unit 230 receives an activation order from the master modem 210, the activation control unit 230 supplies the power to the slave modem 220 only while the slave modem 220 is terminated. Moreover, if the activation control unit 230 receives a termination order from the master modem 210, the activation control unit 230 cuts off the power supply to the slave modem 220 only while the slave modem 220 is activated. In further detail, the activation control unit 230 can comprise the signal processing unit 240 and the power processing unit 250.

The signal processing unit 240 can be connected to each of the master modem 210, the slave modem 220 and the power processing unit 250. In further detail, a non-inversion input terminal 241 of the signal processing unit 240 can be connected to a power control terminal 211 of the master modem 210, and an inversion input terminal 242 of the signal processing unit 240 can be connected to a power switch hold terminal 221 of the slave modem 220. Moreover, an output terminal 243 of the signal processing unit 240 can be connected to a power switch terminal 253 of the power processing unit 250.

The signal processing unit 240 can output an activation starting signal to a power switch terminal 253 of the power processing unit 250 through the output terminal 243, only if the signal processing unit 240 receives an activation order through the non-inversion terminal 241 of the signal processing unit 240 and the signal processing unit 240 receives no signal through the inversion terminal 242. Moreover, the signal processing unit 240 can output an activation ending signal to a power switch terminal 253 of the power processing unit 250 through the output terminal 243, only if the signal processing unit 240 receives a termination order through the inversion terminal 242 of the signal processing unit 240 and the signal processing unit 240 receives an activation checking signal through the inversion terminal 242. The signal processing unit 240 can be an AND gate.

The power processing unit (e.g., Power Management IC, PMIC) 250 can be connected to each of the slave modem 220 and signal processing unit 240. In further detail, a power hold terminal 251 of the power processing unit 250 can be connected to the slave power hold terminal 221, and a power output terminal 252 of the power processing unit 250 can be connected to the power input terminal 222 of the slave modem 220. The power switch terminal 253 of the power processing unit 250 can be connected to an output terminal 243 of the signal processing unit 240. The power processing unit 250 supplies the power to the power input terminal 222 of the slave modem 220 through the power output terminal 252 if an activation starting signal is inputted through the power switch terminal 253 of the power processing unit 250. Moreover, the power processing unit 250 cuts off the power, which has been supplied to the slave modem 220, if an activation terminating signal is inputted through the power switch terminal 253 of the power processing unit 250. The power processing unit 250 can verify that the slave modem 220 is activated and/or terminated normally through the slave power hold terminal 221. The structures of the power processing unit (e.g., PMIC) 250 is well known to any person of ordinary skill in the art, and thus will be omitted from the description.

FIG. 3 shows a flowchart of a method for controlling the modem power for an MB-MM mobile communication terminal based on a preferred embodiment of the present invention.

Hereinafter, a method for controlling the modem power in an MB-MM mobile communication terminal 200 based on a preferred embodiment of the present invention will be described in detail with reference to FIG. 3. In this description, it is assumed that the master modem 210 is a WCDMA modem, and the slave modem 220 is a CDMA modem.

In step 310, the master modem 210 outputs an activation order to the signal processing unit 240 to activate the slave modem 220. There can be a variety of cases for which the slave modem 220 is activated. As an example, the MB-MM mobile communication terminal 200 moves from a WCDMA mobile communication network to a CDMA mobile communication network. That is, the slave modem 220 is inactivated while the MB-MM mobile communication terminal 200 is in a master mode, and the master modem 210 has to activate the slave modem 220 in order to execute an intersystem handover from the master modem 210 to the slave modem 220.

In step 320, if the signal processing unit 240 receives an activation order, the signal processing unit 240 determines whether the slave modem 220 is terminated. As a result of the determination, if the slave modem 220 is activated already, the signal processing unit 240 outputs no signal. After a predetermined duration after the signal processing unit 240 outputted the activation order, the signal processing unit 240 can regard that the slave modem 220 is activated normally.

However, if the slave modem 220 is determined to be inactivated, the signal processing unit 240 transmits an activation starting signal to the power processing unit 250 in order to supply the power to the slave modem 220, in step 330. The signal processing unit 240 can be an AND gate. In other words, the signal processing unit 240 outputs the activation starting signal (i.e. a "High" state signal) only if the activation starting signal (i.e. a "High" state signal) is inputted through a non-inversion input terminal 241 of the signal processing unit 240 and the activation checking signal is not inputted (i.e. a "Low" state signal) through an inversion input terminal 242 of the signal processing unit 240. This is because a "Low" state signal inputted through the inversion input terminal 242 is inversed to a "High" state signal.

As such, the signal processing unit 240 can determine whether the slave modem 220 is activated or not, and consequently the master modem 210 can control the activation of the slave modem 220 more reliably. In other words, the non-inversion input terminal 241 of the signal processing unit 240 is kept in a "High" state if the master modem 210 outputs the activation starting signal, and the inversion input terminal 242 of the signal processing unit 240 is kept in a "Low" state if the slave modem 220 is not activated. Therefore, the output terminal 243 of the signal processing unit 240 outputs the activation starting signal until the slave modem 220 is activated. As a result the master modem 210 can control the activation of the slave modem 220 more reliably.

In step 340, the power processing unit 250, if an activation starting signal is received, supplies the power to the slave modem 220, and in step 350 the slave modem is activated.

In step 360, once the slave modem 220 starts to activate normally, the slave power hold terminal 221 outputs an activation checking signal, and the signal processing unit 240 no longer outputs an activation starting signal.

The accompanying drawings and detailed description are only an example of the present invention in which the master modem 210 outputs an activation order. However, the same can be applied when the master modem 210 outputs a termination order. For example, if the master modem 210 outputs a termination order, the signal processing unit 240 determines whether the slave modem 220 is activated or not and outputs an activation terminating signal only if the slave modem 220 is activated (that is, an activation checking signal is outputted). The power processing unit 250, having received the activation terminating signal, cuts off the power that is supplied to the slave modem 220, and the slave modem 220 is terminated and no longer outputs an activation checking signal.

INDUSTRIAL APPLICABILITY

As described above, the present invention can provide an MB-MM mobile communication terminal that is able to prevent an equipped modem from being read as activated although the equipped modem is actually not activated and a method for controlling the modem power of the MB-MM mobile communication terminal.

Moreover, the present invention can provide an MB-MM mobile communication terminal that is able to prevent an equipped modem from being read as terminated although the equipped modem is actually not terminated and a method for controlling the modem power of the MB-MM mobile communication terminal.

Moreover, the present invention can provide an MB-MM mobile communication terminal that is able to prevent serious drain of battery power caused by regarding an equipped modem as terminated although the equipped modem is actually not terminated and a method for controlling the modem power of the MB-MM mobile communication terminal.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A multiband-multimode (MB-MM) mobile communication terminal comprising a first modem and a second modem, the MB-MM mobile communication terminal further comprising:

an activation control unit for determining whether said second modem is activated if an activation starting order for activating said second modem is inputted from said first modem, and authorizing power to said second modem only if activation of said second modem is terminated, wherein said activation control unit includes:

a signal processing unit receiving said activation starting order from said first modem through a non-inversion input terminal, determining whether said second modem is activated, and outputting a power authorization order through an inversion input terminal if the activation of said second modem is determined to be terminated; and a power processing unit authorizing the power to said second modem in accordance with said power authorization order.

2. The MB-MM mobile communication terminal of claim 1, wherein said signal processing unit is an AND gate.

3. A multiband-multimode (MB-MM) mobile communication terminal comprising a first modem and a second modem, the MB-MM mobile communication terminal further comprising:

an activation control unit determining whether said second modem is activated, if said activation control unit receives a termination order from said first modem for terminating said second modem, and cutting off power applied to said second modem only if said second modem is activated, wherein said activation control unit includes:

a signal processing unit receiving said termination order from said first modem through a non-inversion input terminal, determining whether said second modem is activated and outputting a power cutoff order through an inversion input terminal if said second modem is determined to be activated; and a power processing unit cutting off the power applied to said second modem in accordance with said power cutoff order.

4. The MB-MM mobile communication terminal of claim 3, wherein said signal processing unit is an AND gate.

5. A method for controlling the modem power of an MB-MM mobile communication terminal comprising a first modem, a second modem and an activation control unit, the method for controlling the modem power performed by said activation control unit, the method comprising the steps of:

receiving an activation order for activating said second modem from said first modem;

determining whether the activation of said second modem is terminated; and authorizing power to said second modem only if activation of said second modem is terminated, wherein said activation control unit includes:

a signal processing unit receiving said activation order from said first modem through a non-inversion input terminal, determining whether said second modem is activated and outputting a power authorization order through an inversion input terminal if the activation of said second modem is determined to be terminated; and a power processing unit authorizing the power to said second modem in accordance with said power authorization order.

6. The method of claim 5, wherein said signal processing unit is an AND gate.

7. A method for controlling the modem power of an MB-MM mobile communication terminal comprising a first modem, a second modem and an activation control unit, the method for controlling the modem power performed by said activation control unit, the method comprising the steps of:

receiving a termination order for terminating said second modem from said first modem;

determining whether said second modem is activated; and cutting off power applied to said second modem only if said second modem is activated, wherein said activation control unit includes:

a signal processing unit receiving said termination order from said first modem through a non-inversion input terminal, determining whether said second modem is activated and outputting a power cutoff order through an inversion input terminal if said second modem is activated; and a power processing unit cutting off the power applied to said second modem in accordance with said power cutoff order.

8. The method of claim 7, wherein said signal processing unit is an AND gate.

* * * * *